US006152082A

United States Patent [19]

Simmons et al.

[11] Patent Number: 6,152,082

[45] Date of Patent: *Nov. 28, 2000

[54] MATERIALS AND METHODS FOR APPLYING A TREATMENT TO ANIMALS

[75] Inventors: William Clayton Simmons, Naples; Michael John Burridge, Gainesville; Leigh Anne Simmons, Naples, all of Fla.

[73] Assignee: University of Florida, Gainesville, Fla.

[ * ] Notice: This patent is subject to a terminal disclaimer.

[21] Appl. No.: 09/156,352

[22] Filed: Sep. 18, 1998

Related U.S. Application Data

[63] Continuation-in-part of application No. 09/057,990, Apr. 9, 1998, which is a continuation-in-part of application No. 08/933,550, Sep. 19, 1997, Pat. No. 5,911,196.

[51] Int. Cl.[7] .......... A01K 13/00

[52] U.S. Cl. .......... 119/651; 119/657; 119/652

[58] Field of Search .......... 119/651, 652, 119/657, 660

[56] References Cited

U.S. PATENT DOCUMENTS

| | | | |
|---|---|---|---|
| 1,528,402 | 3/1925 | Clements | 119/652 |
| 2,586,761 | 2/1952 | Eskola . | |
| 2,976,842 | 3/1961 | Hagar . | |
| 2,998,803 | 9/1961 | Worden | 119/660 |
| 3,071,111 | 1/1963 | Hamilton . | |
| 3,118,427 | 1/1964 | Stanzel . | |
| 3,137,274 | 6/1964 | Palmer . | |
| 3,159,144 | 12/1964 | Duncan et al. . | |
| 3,187,722 | 6/1965 | Gilmore et al. . | |
| 3,727,586 | 4/1973 | Brewster . | |
| 3,870,023 | 3/1975 | Wilson . | |
| 3,941,096 | 3/1976 | Mann . | |
| 4,023,533 | 5/1977 | Mann . | |
| 4,055,150 | 10/1977 | Williams . | |
| 4,324,202 | 4/1982 | Stonestreet et al. | 119/660 X |
| 4,459,942 | 7/1984 | Cauthron . | |
| 5,027,747 | 7/1991 | Talley . | |
| 5,151,363 | 9/1992 | Payne | 435/252.5 |
| 5,325,814 | 7/1994 | Duncan | 119/657 |
| 5,357,902 | 10/1994 | Norval et al. . | |
| 5,367,983 | 11/1994 | Pound et al. | 119/53 |

FOREIGN PATENT DOCUMENTS

| | | |
|---|---|---|
| 8800079 | 7/1989 | ARIPO . |

OTHER PUBLICATIONS

Sonenshine, Daniel E., Sandra A. Allan, R. Andrew I. Norval, Michael J. Burridge (1996) "A self-medicating applicator for control of ticks on deer" Medical and Veterinary Entomology 10:149–154.

Duncan, I.M. and N. Monks (1992) "Tick Control On Eland (*Taurotragus oryx*) And Buffalo (*Syncerus caffer*) With Flumethrin 1% Pour–On Through A Duncan Applicator" J. S. Afr. Vet Ass. 63:(1):7–10.

Duncan, I.M. (1992) "Tich Control On Cattle With Flumethrin Pour–On Through A Duncan Applicator" J. S. Afr. Vet Ass. 63(3):125–127.

*Primary Examiner*—Robert P. Swiatek
*Attorney, Agent, or Firm*—Saliwanchik, Lloyd & Saliwanchik

[57] ABSTRACT

A self-medicating applicator device that can be used to apply a treatment to animals.

7 Claims, 3 Drawing Sheets

MATERIALS AND METHODS FOR APPLYING A TREATMENT TO ANIMALS

CROSS-REFERENCE TO A RELATED APPLICATION

This application is a continuation-in-part of co-pending application Ser. No. 09/057,990, filed Apr. 9, 1998; which is a continuation-in-part of application Ser. No. No. 08/933,550, filed Sep. 19, 1997, and now Pat. No. 5,911,196.

FIELD OF THE INVENTION

The present invention provides highly effective materials and methods for applying treatments to animals. In a specific embodiment, the invention relates to controlling populations of internal and external pests that attack livestock, deer, and other domestic and wild animals.

BACKGROUND OF THE INVENTION

Treating livestock and game animals to control ticks, biting flies, and similar haematophagous or noxious arthropods or other parasitic pests is essential to prevent major economic losses. Typically, these parasites pierce the skin of animals, causing damage to the hides, blood loss, and irritation, as well as transmission of deadly infectious diseases. These factors contribute to the enormous economic losses sustained by the livestock industry. Losses in livestock production (cattle, sheep, swine, and poultry) in the U.S. due to arthropod pests have been estimated at more than $3 billion. This figure does not include the cost of pest control or losses to the equine industry (Drummond, R. O., J. E. George, S. E. Kunz [1988] *Control of Arthropod Press of Livestock: a Review of Technology,* CRC Press, Inc., Boca Raton, Fla., 245 pp.). Although precise figures for most countries are lacking, estimates of world-wide economic losses due to ticks and tick-borne diseases alone are in the billions of dollars.

Bovine parasitism is the source of some of the most severe economic losses encountered by cattle producers in the United States. Cattle are infected by internal and external parasites that range from brown stomach worm (the most common) to lungworm, mites, ticks, and lice.

Ticks affect approximately 800 million cattle and a similar number of sheep throughout the world (Sutherst, R. W., R. J. Jones, H. J. Schnitzerling [1982] *Nature* (London) 295:320–322). McCosker (McCosker, P. J. [1979] "Global aspects of the management and control of ticks of veterinary importance," *In Recent Adv. Acarology,* Rodriguez, J. D. (ed.), 2:45–53) estimated the world-wide impact of tick-borne diseases of cattle at approximately $7 billion. In addition to transmission of diseases, ticks cause severe damage due to failure of cattle to achieve expected weight gains and damage to hides to be used for leather. According to Norval (Norval, R.A.I. [1990] *Parasitologia* 32:155–163), weight losses in cattle are estimated at 4.4 grams per *Rhipicephalus appendiculatus* female and 10 grams per *Amblyomma hebraeum* female. Estimates of losses in wildlife are unavailable; however, tick infestations of white-tailed deer (*Odocoileus virginianus*) in some areas are so severe that they have been reported to kill fawns (Drummond et al., supra).

Internal parasites are also a major economic and health problem. Nearly all vertebrates and many invertebrates are affected by internal parasites, for example, the Platyhelminthes and filarial worms.

Treatment or prevention of internal parasite, insect, and tick infestations in animals, especially animals in the wild, is a formidable task. Thus, it is not surprising that no single, universally accepted method is available for this purpose. Common practices for delivering a pesticide, e.g., an insecticide or an acaricide, to livestock include (1) direct, whole-body treatment, where the animal's body is drenched with pesticide-containing liquids; (2) systemics, where the pesticide is allowed to circulate in the host's blood; and (3) controlled-release systems, which are usually physically attached to the animal and which release pesticide continuously over a period of weeks or months.

There are disadvantageous features to all of these previously described methods. Whole body treatments involve substantial waste. In addition, for dipping or spraying, the animals must be herded and driven to, or through, the treatment area. Such procedures are both labor-intensive and stressful to the livestock. Moreover, due to the high potential for spillage, these operations pose significant environmental hazards for the surrounding area as well as health hazards for workers.

Systemics are generally not acceptable, especially for food animals, because of the toxic residues that can concentrate and remain in animal tissues for extended periods. Controlled-release devices, e.g., ear tags, risk infection or skin irritation when these devices are attached to the animal's body. None of these procedures are suitable for use with wildlife such as deer or other large herbivores.

Common methods of administering anthelmintics include injection and oral administration. The disadvantage of injectable formulations of anthelmintics include unwanted side effects and injection site blemishes that can reduce meat's marketability. Oral formulations are, at best, impractical in the case of large herds of domestic animals and unfeasible in the case of wild animals such as deer.

An alternative to the methods described above is self-medication. In self-medication methods, an animal which is attracted to a device that offers a bait, e.g., food, materials for nest construction, etc., is sprayed or coated with pesticide-containing composition when the animal either contacts the device or in some way triggers the device to release the pesticide. Such methods offer an advantage over the previously described methods by minimizing the amounts of pesticide dispersed to the host and, consequently, into the environment.

One well-known example of a self-medicating device is the Duncan Applicator (ARIPO Patent No. AP/88/00079), which has been used to treat livestock and wild ungulates in Africa. The Duncan Applicator consists of a container placed on top of a tall, threaded rod which is placed in a bin containing feed. The overhead container releases an oily liquid pesticide mixture which slowly flows down the rod. When the animals place their heads in the bin to eat the feed, they touch the rod and receive a small amount of pesticide. The Duncan Applicator, due to its design, has limited utility for treating livestock and most wildlife. A principal disadvantage of the Duncan Applicator device is that the container at the top of the threaded rod is small and is exhausted in a short period of time, usually requiring the device to be recharged every day. Such high incidence of maintenance makes the Duncan Applicator difficult to use in areas which may be inconvenient to reach or inaccessible under inclement weather conditions. Further, daily recharging of the Duncan Applicator incurs a high labor cost, making the cost of using the device unattractive. Substituting a larger capacity container on the Duncan Applicator would not provide a complete remedy to the disadvantage of high maintenance. A larger capacity container would increase the tendency for the Duncan Applicator to tip over. If the device is tipped over, the result is a spill of the pesticide on the ground contaminating the environment. The Duncan Applicator poses an environmental threat since the pesticide is not contained and may easily be spilled if the Applicator is knocked over. Two scientific articles have been published relating to this Applicator (Duncan, I. M. (1992) "Tick control on cattle with flumethrin pour-on through a Duncan applicator," *J. S. Aft. Vet. Assoc.* 63:125–127 and Duncan, I. M., N. Monks (1992) "Tick control on eland (*Taurotragus oryx*) and buffalo (*Syncerus caffer*) with flumethrin 1% pour-on through a Duncan applicator," *J. S. Aft. Vet. Assoc.* 63:7–10).

Other variations of self-medicating devices have also been described. U.S. Pat. No. 3,870,023 describes an insecticide applicator for livestock which utilizes a wind-powered spray device. This clearly is distinguished from the subject invention, which does not use a spraying device to apply insecticide. Nor does the subject invention rely on wind power to dispense insecticide.

Other combination feeder/applicators include the inventions described in U.S. Pat. Nos. 3,137,274, 3,187,772, 3,941,096, 4,023,533, and 4,459,942. Each of these patents discloses a feeder to attract livestock and a means for dispensing insecticide which is operable when contacted by the animal. However, none of these patents describe a device which incorporates the elements of the subject invention.

U.S. Pat. No. 3,118,427 describes a "bunt bag" which dispenses liquid insecticide when the bag is contacted by an animal. The No. '427 device essentially uses an absorbent material to surround the liquid pesticide storage area. U.S. Pat. No. 3,159,144 uses gravity to transfer insecticide from a cable or chain core, saturated with pesticide, to absorbent discs which surround the core. These devices also have limited container capacity and require frequent maintenance.

The livestock oiler disclosed in U.S. Pat. No. 3,727,586 also dispenses insecticide when the animal contacts the device. The No. '586 patent employs a container which supplies pesticide by gravity to valves which open to dispense insecticide upon contact or rubbing of the valves by the animal. The apparatuses disclosed in U.S. Pat. No. 5,027,747 pertain to the use of absorbent wicks which contact an animal as it passes through a pathway.

The USDA/ARS has patented an apparatus for topical pesticide treatment of wildlife (U.S. Pat. No. 5,367,983). This device consists of four columns around two feed bins. The pesticide is stored in a container in the center of the unit, adding weight to an already substantially unwieldy contraption which is too heavy to be manually lifted.

U.S. Pat. No. 5,357,902 pertains to the UF self-medicating applicator of Norval, Meltzer, Sonenshine and Burridge. This applicator contains a container for pesticide storage as opposed to the disposable, self-contained column of the subject invention which allows facile, effortless recharging with treatment material. This applicator is the subject of the following scientific article: Sonenshine, D. E., Allan, S. A., Norval, R.A.I. and Burridge, M. J. (1996) "A self-medicating applicator for control of ticks on deer," *Med. Vet. Entomol.* 10:149–154.

It is therefore an object of the subject invention to provide an efficient, low-maintenance self-medicating applicator for wild animals and livestock, e.g., cattle, wild deer, etc. The applicator of the subject invention can store an amount of a treatment sufficient to make the applicator maintenance-free for several days, weeks, or months, and dispense a treatment externally to an animal in such a manner as to treat the animal. The invention can be used to deter or kill dangerous, disease-transmitting ticks and other biting insects and to kill internal parasites. As used herein, reference to "treatment" includes any pesticide, anthelmintic, medicament, lotion, repellant, or other composition which is to be applied to an animal. As used herein, reference to "pesticide" includes chemical pesticides or anthelmintics, as well as entomopathic fungi, nematodes, and bacteria, and compounds such as repellants and growth regulators.

BRIEF SUMMARY OF THE INVENTION

The subject invention pertains to unique methods and devices useful for applying treatments to animals. In one embodiment, the subject invention provides devices which can be used to effectively apply pesticides, including anthelmintics, to animals. Advantageously, the devices of the subject invention can be used in remote locations to apply liquids to livestock or wild animals. Preferably, the liquid can be a composition comprising any treatment which is applied to an animal.

In a preferred embodiment, the device of the subject invention comprises a housing which can hold a liquid or a liquid container. The housing can be constructed of high density polyethylene, PVC, treated cardboard, or other sturdy, non-corrosive and non-biodegradable material. In one embodiment, the housing is surrounded by an absorbent material through which a liquid can move and be transferred to an animal. Upon placing the liquid container into the housing portion of the subject invention, the liquid container is punctured, or otherwise opened, thereby allowing the liquid to flow from the container. The liquid then travels to the absorbent material where the liquid spreads through the absorbent material and can be transferred to an animal which contacts the material.

In an additional embodiment, the housing is itself sufficiently porous to permit a liquid to permeate through from an inner cavity to an outer surface where an animal can contact the outer surface and the treatment. In this embodiment, the treatment may be poured directly into the housing, or the treatment may be introduced into the housing in a container which is, for example, then punctured. The housing may be mounted vertically, horizontally, or in any other appropriate orientation.

Animals can be attracted to the device of the subject invention by a suitable attractant and, while contacting the attractant, they are treated passively by contact with the outer surface. In one embodiment the device of the subject invention has an animal attractant receptacle which holds, for example, food, materials for nest construction, pheromonal preparations, other attractants, or the like, strategically disposed in relation to the housing so that an animal, while obtaining a bait therefrom, will necessarily contact the absorbent material and thus apply to itself the liquid. As the liquid formulation preferably comprises an active ingredient for treating the animal, the animal thus becomes treated with an appropriate medicament each time it contacts the absorbent material. In this manner, the animal is treated regularly and, advantageously, without the undesired stress of human handling, or the expense of dipping stations, spraying equipment, and related facilities.

In a specific embodiment, the device of the subject invention consists of a column which has a weather guard attached to the top and an animal attractant at the bottom. In another embodiment, the device is mounted horizontally at, for example, the edge of a feed bin such that animals which come to feed contact the device as they access the feed. This embodiment can utilize a porous housing such as high density polyethylene, wherein the treatment is poured or flows in the housing and then wicks to the outer surface of the housing. In a preferred embodiment, the animal attractant is contained within an animal attractant receptacle. The device can be attached to any suitable structure (e.g., buildings, trees, fence posts), or it can be free standing. In one embodiment, the weather guard and attractant receptacle can be cone shaped and can act as the attachment points for installation of the invention.

In one embodiment, the housing is a hollow tube, the upper portion of which is adapted to contain the treatment to be applied to the animal. The treatment can be contained in the upper portion of the column in a container which is activated at the time of installation. At the time of installation, the container can be ruptured by an activation mechanism. In one embodiment, the activation mechanism is contained at the base of the upper portion or within the lower portion of the column. The treatment will then flow to the absorbent material or will pass through a porous housing. The column will be saturated both by using the force of gravity to draw the treatment down the lower portion of the absorbent material or porous housing and by the wicking action of the absorbent material or porous housing to draw the treatment up the upper portion of the device. The treatment and activation mechanism can be separated by a simple bulkhead inside the housing.

Upon complete utilization of the treatment, the liquid container can be removed and replaced with a new container. Alternatively, additional fluid can flow, or be poured, into the cavity in the housing. If a container is used, the empty container can be recycled or otherwise disposed of in an appropriate manner.

If the device of the subject invention is designed as a column, the column can be specifically constructed to fit onto the column supports of other applicators. In this way, the self-contained treatment columns can replace the original columns, thereby allowing the treatment containers to be eliminated and consequently reducing possible environmental contamination. After weeks of treatment with the other applicators, only the spent column would need to be disposed of and replaced.

The subject invention further concerns a method for delivering a treatment, whereby the method employs the novel applicator device as described herein. More specifically, the method comprises placing the novel applicator device in an area accessible to the animal to be treated and supplying the applicator with a bait, e.g., feed, and an appropriate treatment composition.

This invention is unique and advantageous because it is light-weight and can be made portable, with a self-contained treatment component, and can easily be transported by one person. Also, the subject invention is efficient, low maintenance, environmentally sound and easy to use.

DETAILED DISCLOSURE OF THE INVENTION

The subject invention provides a device for easy, efficient, and effective administration of treatments to animals. Advantageously, this administration can occur passively without the need for human intervention. Specifically, the subject invention provides a system whereby animals contact a surface having a composition to be applied to the animal. This composition is readily transferred from the surface to the animal. In a preferred embodiment the treatment contains a pesticide or other medicament. In a specific embodiment, the subject invention concerns a novel device and method for self-medicating an animal susceptible to infestation by pests, including pestiferous ticks and flies which can transmit disease. As used herein, reference to "pesticide" includes chemical pesticides as well as entomopathic fungi, nematodes, and bacteria, and compounds such as repellants and growth regulators.

In a preferred embodiment, the device of the subject invention comprises a housing into which liquid can be introduced or a liquid container can be placed. If a container is used, it can be sealed and portable. The container is constructed so that, upon placement into the housing, the container is punctured, or otherwise opened, permitting liquid to exit the container. This liquid can be conducted to an absorbent material which covers the housing, or the housing itself may be porous. The liquid moves through the absorbent material or porous housing by gravity, capillary action, absorption, diffusion, or other similar physical process so that the absorbent material or porous housing is thoroughly wetted with the liquid.

The device of the subject invention is preferably disposed in close proximity to an animal attractant. In one embodiment, an animal attractant receptacle is disposed adjacent to the housing such that feed, salt, or similar animal attractant placed in the animal attractant receptacle will attract animals to close proximity of the device and particularly the outer surface having the treatment. Specifically, the device can be mounted horizontally along the edge of a feed bin. The animal attractant receptacle is preferably substantially open at the top to allow an animal to feed ad libitum.

Figure 1:
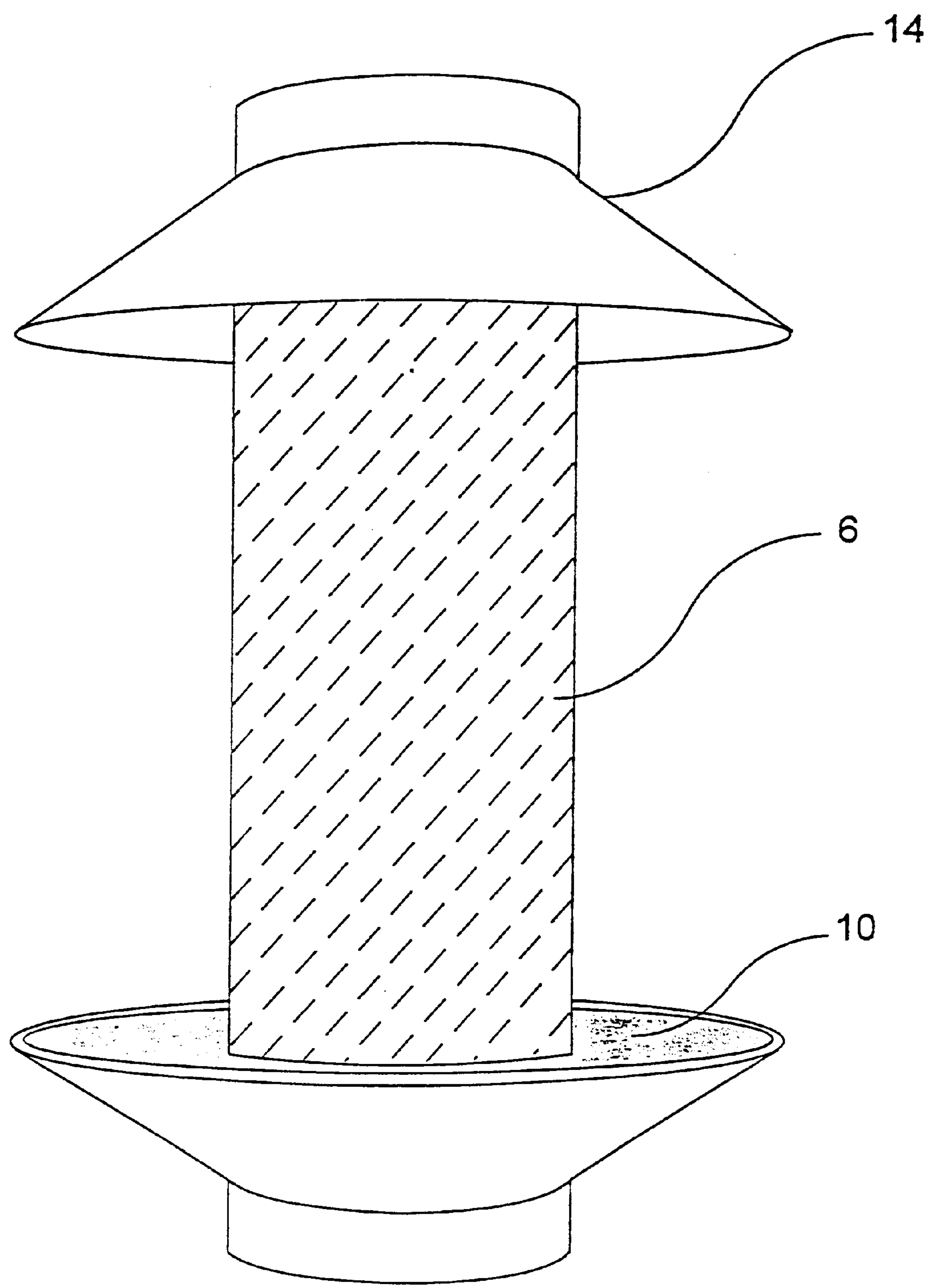
FIG. 1 shows a specific embodiment of the device of the subject invention having a weather guard and an animal attractant receptacle.
Figure 2:
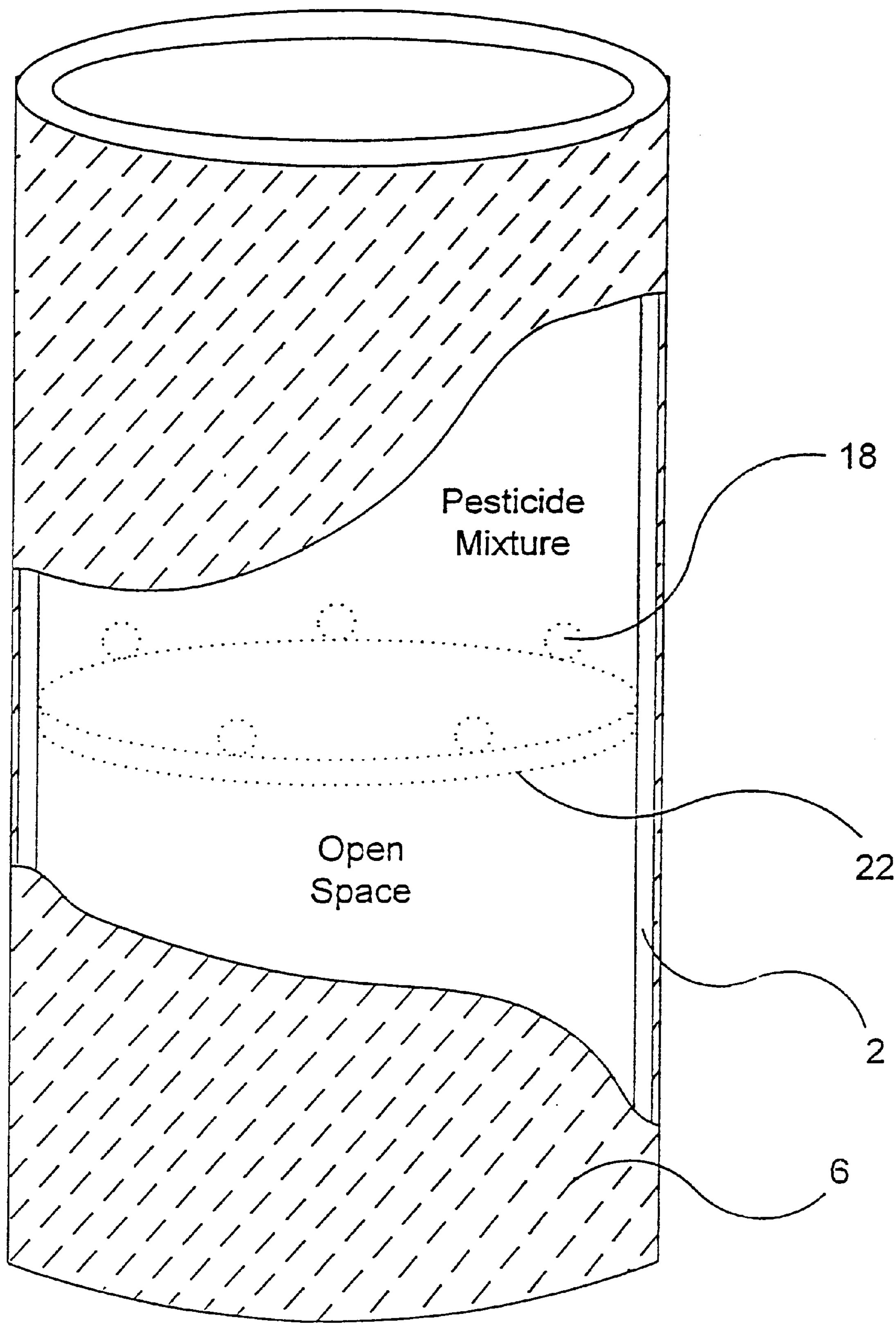
FIG. 2 shows the design of one embodiment of the subject invention having a liquid container compartment at the top portion of the housing wherein holes in the housing conduct the liquid to the surrounding absorbent material.
Figure 3:
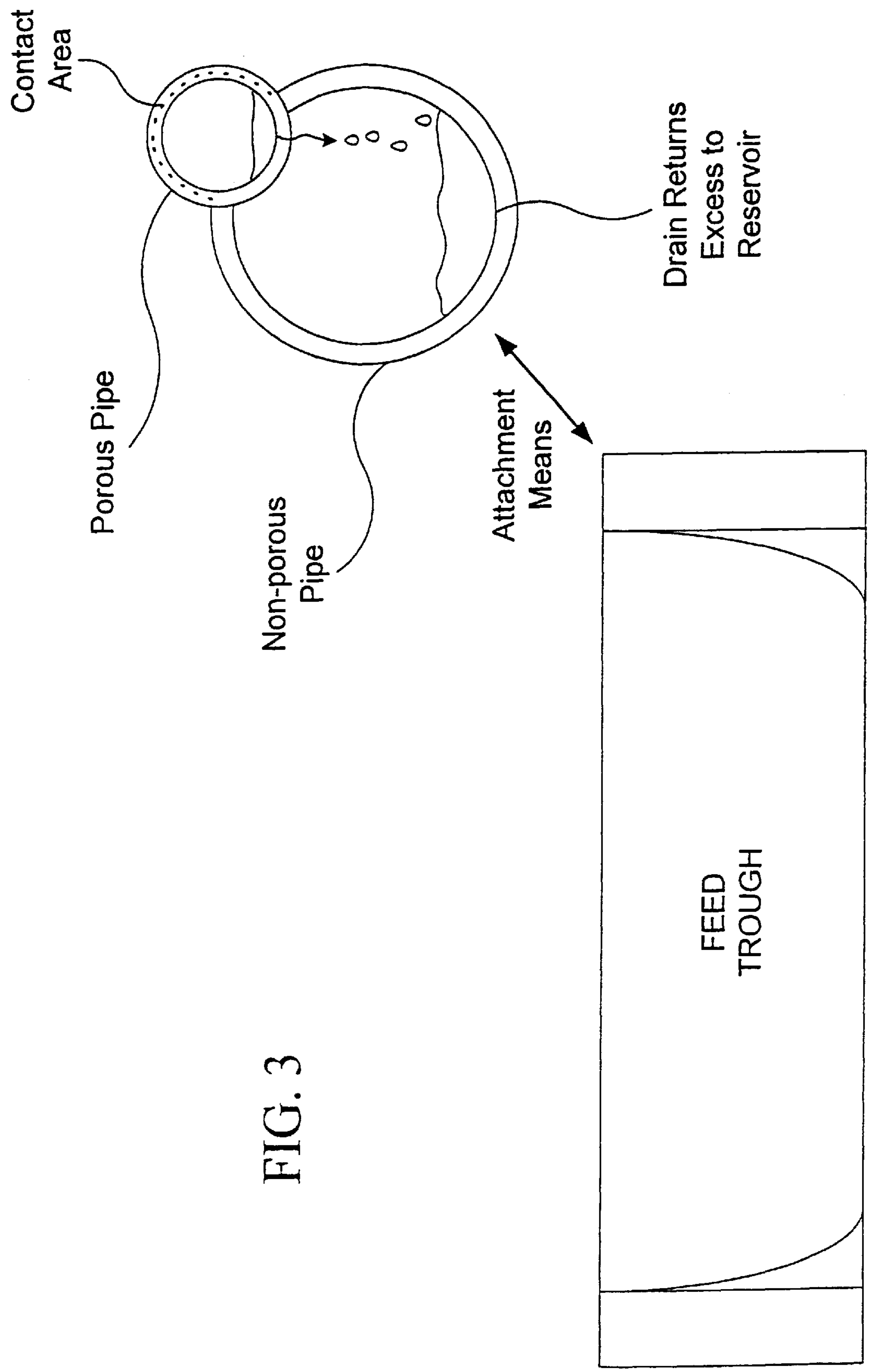
FIG. 3 shows an embodiment of the invention utilizing a porous housing through which the treatment permeates to the outer surface.

When a porous housing is mounted horizontally, it may have disposed about its bottom portion an impermeable material, such as PVC pipe, to prevent dripping and to retain the treatment in the device. The treatment will then wick to the upper portion of the device where it will be contacted by animals. As shown in FIG. 3, the impermeable portion may form a channel into which excess treatment can be collected and recycled or disposed of. In the horizontal configuration, or other orientations, the treatment may be supplied from a storage receptacle. The treatment is allowed to flow through the porous pipe. The wicking action of the porous pipe draws the treatment to the outer surface (contact area) of the pipe. Excess treatment drains into a non-porous pipe and then (optionally) back into the treatment reservoir. Animals contact the outer surface of the porous pipe while feeding at the trough, thus resulting in "passive treatment."

In use, an animal will visit the device of the subject invention because of the animal attractant. Upon ingesting or otherwise inspecting the animal attractant, the animal will contact the outer surface of the device thereby having the treatment transferred to the animal. Typically, the treatment will be an oil based formulation and this oil based liquid will be transferred to the hair, fur, or skin of the animal. The liquid will then spread due to normal diffusion, flow, and grooming, and will ultimately cover an effective portion of the animal thereby providing medication and/or protection against pests or other desired result.

The device of the subject invention can be produced in any of a broad range of sizes depending upon the intended use for the device. Advantageously, these devices can be used in remote locations; therefore, the devices can be of a size to facilitate easy transportation and handling. In one embodiment the devices are large enough to hold a liquid container containing sufficient treatment to last for weeks or months. This reduces maintenance and the need for adding new liquid containers to the device. Alternatively, the device of the subject invention can be attached to a storage receptacle which provides a continuous or intermittent supply of the treatment directly to the housing.

The device may be any appropriate shape which will allow close contact with an animal attending the animal attractant receptacle. In a preferred embodiment the device will be cylindrical. In the case of a cylindrical housing, the device may be, for example, from about two inches in diameter to about ten inches in diameter. In a preferred embodiment the device will be approximately 3–6 inches in diameter. In one embodiment, the device can be mounted vertically and can stand from about 4 inches in height to 4 feet or more in height. In a preferred embodiment the device is about 2–3 feet in height. In another embodiment, the device is mounted horizontally along, for example, the edge of a feed bin.

The housing may be made from any material which is sturdy and resistant to the elements. The housing should have sufficient rigidity to effectively enclose a liquid and/or a liquid container and to withstand contact with wild animals. Furthermore, the material of the housing should not be susceptible to corrosion or biodegradation. Preferred materials from which the housing may be constructed include PVC, polyethylene, and other sturdy, rigid, plastics. Treated cardboard may also be used. These materials are preferable not only due to their non degradability and their rigidity but also because they are lightweight and therefore facilitate ease of transportation of the device. In a particularly preferred embodiment, high density porous polyethylene can be used.

It will be appreciated by persons of ordinary skill in the art that other embodiments and materials can be used effectively for the housing of the subject device. For example, the housing can be a variety of shapes or sizes, depending on the particular animal being treated or location or placement of the device while in use. Thus, the device can be circular, triangular, rectangular, or of irregular shape.

An inside compartment of the housing is hollow so as to receive the liquid or a container which contains the treatment to be administered to the animals. The liquid container can be inserted into a portion of the inside of the housing wherein this portion, designated herein as the liquid containment compartment, is specifically adapted for receiving and holding the treatment. In one embodiment, a visual monitoring tube for determining residual liquid in the device can also be provided.

In one embodiment the liquid containment compartment will be particularly adapted to receive a treatment container and will have means for puncturing or otherwise opening the liquid container to facilitate a flow of liquid from the liquid container through the porous housing or into a surrounding absorbent material. If an absorbent material is used, the treatment may pass, for example, through holes 18 which have been placed into the housing 2. These holes 18 are of sufficient number and/or size to facilitate the flow of liquid to the absorbent material 6 in quantities which will result in a thorough wetting of the absorbent material 6. In one embodiment the liquid container compartment of the housing is located in the upper portion of the housing such that the flow of liquid into the absorbent material is aided by gravity towards the bottom portion of the device as well as capillary action and diffusion towards the upper portion of the device.

In one embodiment, the platform 22 upon which the liquid container rests within the housing 2 has a means to rupture, puncture, rip, tear, or otherwise open a liquid container. This opening means may be, for example, a sharp or pointed object. Upon opening of the liquid container, the liquid flows out of the container and is conveyed through a porous housing or to an absorbent material at the periphery of the device. The conveyance of the liquid to the absorbent material may be by tubes, channels, tunnels or other appropriate liquid conveyance means. The liquid can flow by the force of gravity and/or capillary action, diffusion or other mechanism. In one embodiment, the conveyance means can be adjusted to control the rate of flow so that fluids of varying concentrations and/or viscosities can be used.

The opening of the liquid container within the housing device can be accomplished by simply placing the container into the housing. Alternatively, the device and/or the container can be adapted to require, for example, the application of additional pressure to effect the opening. This additional pressure may result from, for example, pushing on the container and/or screwing the container into place.

In the embodiment comprising an absorbent material surrounding the housing, any absorbent material may be used so long as the material is able to be wrapped around, or otherwise attached to the housing and is able to conduct liquid throughout the material and transfer this liquid to an animal which comes in contact with the absorbent material. The absorbed material may be wrapped or otherwise detachably connected to the housing. Alternatively, the absorbent material may be molded into or otherwise integrally formed with the housing. Materials such as New Pig "Pig Mat" can be used. In a preferred embodiment of the subject invention the absorbent material may be removed and replaced as necessary in the event that the material becomes damaged, soiled, or otherwise loses its ability to conduct or transfer the liquid.

In another embodiment of the subject invention, the housing may be made so that multiple housings may be attached end to end thereby stacking the housings to achieve a device of greater height or length. The device of the subject invention may be attached to a structure or may be free standing. In the free standing embodiment the device may be equipped with a means for attaching the device to the ground or it may be weighted at the bottom of the device to provide stability. In a preferred embodiment, an animal attractant receptacle is provided adjacent to the device such that food, salt, water, pheromones, minerals, or other attractant can be provided in order to bring animals into proximity of the device. This animal attractant receptacle may be of any appropriate shape or size. In one embodiment the attractant receptacle surround the base of the housing such that an animal approaching from any direction would have access to the animal attractant receptacle and, upon inspecting the material in the receptacle, would come into contact with the outer surface having the treatment.

In one embodiment, the device of the subject invention may also be equipped with a weather guard 14 at the top of the housing 2 so as to reduce exposure to rain and other environmental conditions which could detract from the ability of the device to deliver liquid and/or reduce the longevity of the device. In a preferred embodiment, an absorbent material or porous housing is used which will not absorb water and, therefore, will not become diluted with water. Exclusion of water from this material enhances the ability to efficiently deliver an oil-based treatment. An example of such an absorbent material is the "oil-only" Pig Mat. An example of a porous housing is high-density porous polyethylene having a pore size between about 5 $\mu$m and about 5000 $\mu$m. In a preferred embodiment, the pore size is between about 50 $\mu$m and about 1000 $\mu$m.

The pore size should be of appropriate size so that, for a liquid with a given viscosity, the treatment will pass through the porous material at a rate which is sufficient to provide a uniform continuous coating on the outer surface without excess dripping or leakage.

The device of the subject invention may be used to apply a treatment to virtually any animal. In a preferred embodiment the device is used to apply liquids to vertebrate animals, and most preferably the device is used to apply treatments to wild animals or livestock in remote locations. The device of the subject invention is also highly useful for applying treatments to domestic or feral livestock that are unmanageable (i.e., too wild or active to restrain for standard application of treatments).

The applicator device may be used to apply any liquid formulation and would typically be used to apply oil-based treatments. The treatments may be for the control of, for example, acarines including ticks. The treatments may control other pests such as flies or internal parasites. Traditional chemical formulations may be used as well as herbal remedies and/or biological control agents. The liquid formulation can be supplied in a liquid container which will provide the liquid for an extended period of time without the need for maintenance. Periodically the liquid container can be replaced. Upon replacement the liquid container may be replaced with the same treatment or with a different treatment. In this manner it is possible to rotate treatments, thereby reducing the likelihood of resistance and/or providing the opportunities to control different pests depending upon the current infestation and the time of the year. In a preferred embodiment the treatment would last for at least about three months. In order to achieve this length of service in a preferred embodiment the treatment can be contained in a liquid container of approximately one liter or more.

In using the applicator device, the device can be placed at any location accessible by the animal to be treated and, preferably, is in a location which also facilitates access by a person attending to the maintenance of the applicator device. Animals attracted by a bait, e.g., food, placed in an animal attractant receptacle 10 of the applicator device insert their heads into the receptacle area and, in so doing, contact the device with the top of the head, ears, or neck of the animal. At each contact, the treatment formulation is transferred to the animal's hair and skin and spreads over the surface of the animal's body. A preferred composition can be an oily substance or mixed with a carrier which is an oily substance, e.g., mineral oil, to facilitate the spreading of the composition over the surface of the animal. With the treatment coating the surface of the animal, flying insect pests are thus deterred from landing on and biting the treated animal. In addition, pests, e.g., ticks, fleas, flies, internal parasites, etc., which infest the animals are killed or repelled by the treatment. Repeated contact with the device each time the animal attends the attractant receptacle increases the amount of treatment delivered to each animal. Contact between herd members during grooming, mating, or nurturing of young further disperses the treatment, thereby reaching additional animals that do not directly contact the subject applicator device. Repeated visits on a daily basis by an animal provide continual treatment, in contrast to the periodic treatments that occur when administered by spraying or dipping. In the case of treatment for internal parasites, an applicator device of the subject invention can be placed periodically for administration of treatment formulation on an appropriate schedule for treatment of endoparasites, e.g., once every two to three months, depending on the pesticide used.

Some of the advantages of this treatment method and device are as follows:

1. It is passive. Animals treat themselves.
2. Food or other materials used to attract animals to the applicator device can easily be supplemented as needed, depending upon the rate of removal by the treated animals.
3. The treatment container allows use of the device for many weeks or months without recharging, thus saving valuable manpower.
4. Environmental contamination is minimized because the only treatment used is that which is applied to the target animals. There is no dripping or spraying as occurs with other self-medicating devices, and therefore excess active ingredient is not spilled.
5. The device can be lightweight and portable.
6. The treatment container can be easily replaced.

A variety of liquid treatment compositions can be used. The treatment can be mixed with mineral oil(s) or any other liquid substance which can act as a carrier and diluent. An important criterion for the diluent is that the resultant formulation containing the active ingredient be capable of moving through the housing or absorbent material, and subsequently spreading the liquid formulation onto the animals. One suitable example is a mixture of mineral oil, in a 3:1 volume ratio with a 1% (v/v) solution of permethrin insecticide in a suitable diluent. The rate of saturation of the material will be primarily controlled by the viscosity of the liquid composition or mixture. Therefore, it would be within the skill of a person in the art to determine the optimum viscosity of the treatment composition in order to provide a capillary action rate adequate to rapidly saturate the absorbent material or porous housing, but slow enough to prevent rapid depletion of the contents of the container. The greater the percentage of mineral oil in the mixture, the slower saturation and depletion of the container will occur.

It should be understood that any treatment, medication, lotion, repellent, pesticide, anthelmintic, insecticide, or acaricide, and the like, that is meant to be applied to the exterior of an animal, is suitable for use in the applicator. Organophosphates, synthetic pyrethroids, amidines, and other groups of acaricides are examples of other suitable compounds that can be used. Specifically, in addition to permethrin, lambdacyhalothrin, flumethrin, cyfluthrin, deltamethrin amitraz, crotoxyphos, dichlorvos, cyhalothrin, pirimiphos methyl, or malathion and the like are typical compounds which can be used. Anthelmintics developed for topical application, such as ivermectin, eprinomectin, and moxidectin, can also be used. Biological agents which can be formulated in a liquid can also be used. Further, the applicator can be used to dispense any topical medicament that can be formulated in a liquid formulation. The applicator is particularly useful for applying any topical medicament that must be applied regularly to the head, ears, or neck of an animal which will be using the device.

The materials used and dimensions for the preferred embodiment are typically as described herein. It should be understood and readily apparent that there exists a wide latitude in the exact dimensions of the subject device, and the physical dimensions and volumetric capacities can be readily altered to suit the need of the task at hand and/or the materials available. It is expected that all the materials used in the preferred embodiment are available and can be obtained from a commercial hardware or supply store or similar establishment.

It should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for treating an animal to control internal parasites wherein said method comprises providing a device wherein said device comprises an inside compartment and an outer surface; wherein said inside compartment is defined by a rigid housing comprising a porous portion having a plurality of uniformly-distributed pores such that liquid pesticide within said inside compartment is communicated from said inside compartment via said pores to said outer surface thereby uniformly coating substantially the entire outer surface of said porous portion; and wherein said method further comprises placing said pesticide in said housing such that said pesticide is conveyed to said outer surface where it may be contacted by an animal.

2. The method, according to claim 1, wherein said device is mounted horizontally.

3. The method, according to claim 1, wherein said device is mounted at the edge of ail animal feed bin.

4. The method, according to claim 1, wherein said housing comprises a high-density porous polyethylene having a pore size between about 5 μm and about 5000 μm.

5. The method, according to claim 4, wherein said pore size is between about 50 μm and about 1000 μm.

6. The method, according to claim 1, wherein the bottom portion of said housing comprises a means to prevent dripping of said treatment from the underside of said housing.

7. The method, according to claim 1, wherein said pesticide is an anthelmintic.

* * * * *

UNITED STATES PATENT AND TRADEMARK OFFICE
CERTIFICATE OF CORRECTION

PATENT NO. : 6,152,082

DATED : November 28, 2000

INVENTOR(S) : Burridge *et al.*

It is certified that error appears in the above-identified patent and that said Letters Patent is hereby corrected as shown below:

Cover Page [75] Inventors:

"William Clayton Simmons, Naples; Michael John Burridge, Gainesville; Leigh Anne Simmons, Naples; all of Fla."

should read

--Michael John Burridge, Gainesville; Leigh Anne Simmons, Naples; William Clayton Simmons, Naples; all of Fla.--

Column 3, line 9: "*J.S. Aft. Vet. Assoc.*" should read. --*J.S. Afr. Vet. Assoc.*--.

Column 3, line 12: "*J.S. Aft. Vet. Assoc.*" should read --*J.S. Afr. Vet. Associ.*--.

Column 12, line 9: "of ail animal" should read --of an animal--.

Signed and Sealed this

First Day of May, 2001

Attest:

NICHOLAS P. GODICI

*Attesting Officer*

*Acting Director of the United States Patent and Trademark Office*